United States Patent
Bienentreu et al.

(10) Patent No.: US 9,435,481 B2
(45) Date of Patent: Sep. 6, 2016

(54) STEAM GENERATOR HEATING TUBE REPAIR DEVICE AND REPAIR METHOD

(71) Applicants: Robert Bienentreu, Mannheim (DE); Nicolas Jeanvoine, Mannheim (DE)

(72) Inventors: Robert Bienentreu, Mannheim (DE); Nicolas Jeanvoine, Mannheim (DE)

(73) Assignee: Westinghouse Electric Germany GmbH (DE)

( * ) Notice: Subject to any disclaimer, the term of this patent is extended or adjusted under 35 U.S.C. 154(b) by 471 days.

(21) Appl. No.: 13/717,629

(22) Filed: Dec. 17, 2012

(65) Prior Publication Data
US 2013/0199462 A1   Aug. 8, 2013

(30) Foreign Application Priority Data
Dec. 16, 2011   (DE) .......................... 10 2011 121 204

(51) Int. Cl.
*F16L 55/18*   (2006.01)
*F16L 55/163*   (2006.01)
(Continued)

(52) U.S. Cl.
CPC .............. *F16L 55/18* (2013.01); *F22B 37/107* (2013.01); *F28F 11/02* (2013.01); *B21D 39/06* (2013.01); *B23P 6/04* (2013.01); *B23P 15/26* (2013.01); *F16L 55/163* (2013.01); *F16L 55/1653* (2013.01); *F22B 37/002* (2013.01); *Y10T 29/49352* (2015.01); *Y10T 29/49361* (2015.01); *Y10T 29/49375* (2015.01); *Y10T 29/49737* (2015.01); *Y10T 29/53987* (2015.01)

(58) Field of Classification Search
CPC ..... F16L 55/163; F16L 55/18; F16L 55/165; F16L 55/1652; F16L 55/1653; F22B 37/003; F22B 37/002; F22B 37/107; F22B 37/108; Y10T 29/49352; Y10T 29/49361; Y10T 29/49375; Y10T 29/49723; Y10T 29/49732; Y10T 29/49734; Y10T 29/49737; Y10T 29/49742; Y10T 29/53987; B23P 15/26; B23P 6/00; B23P 6/04; B21D 39/06; B28F 11/02
See application file for complete search history.

(56) References Cited

U.S. PATENT DOCUMENTS 3,317,222 A * 5/1967 Maretzo .......................... 285/55
4,592,577 A    6/1986 Ayres et al.
(Continued)

FOREIGN PATENT DOCUMENTS

DE        2115351 A1   10/1971
DE   102005032118 A1    1/2007
(Continued)

OTHER PUBLICATIONS

Special Metals, "INCONEL® alloy 690," Oct. 9, 2009.
(Continued)

*Primary Examiner* — Sarang Afzali
(74) *Attorney, Agent, or Firm* — Loren Donald Pearson; Assouline & Berlowe, P.A.

(57) ABSTRACT

A steam generator heating tube repair sleeve has an encircling flange, conical region, and a straight region. The encircling flange merges into a conical region that tapers on the outside in the direction of the other sleeve end and which is adjoined to the straight region. A steam generator heating tube repair method is used to repair a steam generator heating tube that is installed in a steam generator having a defective tube end. The method includes conical milling out of the defective tube end, inserting a steam generator heating tube repair sleeve into the conically milled-out defective tube end, rolling in the steam generator heating tube repair sleeve, and welding the flange region.

5 Claims, 6 Drawing Sheets

(51) Int. Cl.
*F16L 55/165* (2006.01)
*F28F 11/02* (2006.01)
*F22B 37/10* (2006.01)
F22B 37/00 (2006.01)
B21D 39/06 (2006.01)
B23P 15/26 (2006.01)
B23P 6/04 (2006.01)

(56) References Cited

U.S. PATENT DOCUMENTS

| | | | |
|---|---|---|---|
| 4,615,477 A * | 10/1986 | Spada et al. | 228/119 |
| 4,819,315 A | 4/1989 | Cartry | |
| 4,941,512 A * | 7/1990 | McParland | 138/97 |
| 5,271,048 A * | 12/1993 | Behnke et al. | 376/260 |
| 5,274,683 A * | 12/1993 | Broda et al. | 376/260 |
| 5,350,011 A | 9/1994 | Sylvester | |
| 5,797,446 A | 8/1998 | Blomgren | |
| 5,918,911 A * | 7/1999 | Sims | 285/13 |
| 8,210,245 B2 * | 7/2012 | Gillessen et al. | 165/134.1 |
| 2008/0202732 A1 | 8/2008 | Gillessen et al. | |

FOREIGN PATENT DOCUMENTS

| | | |
|---|---|---|
| GB | 1141239 | 1/1969 |
| GB | 1336555 | 11/1973 |

OTHER PUBLICATIONS

Special Metals, "The story of the "INCOLOY® alloys series," from 800 through 800H, 800HT®," Sep. 4, 2004.
European Search Report EP 12 00 8251, Aug. 7, 2014.

* cited by examiner

STEAM GENERATOR HEATING TUBE REPAIR DEVICE AND REPAIR METHOD

CROSS-REFERENCE TO RELATED APPLICATIONS

The instant application claims priority of German Patent application number DE 10 2011 121 204.7, filed Dec. 16, 2011, which is hereby incorporated by reference.

STATEMENT REGARDING FEDERALLY SPONSORED RESEARCH OR DEVELOPMENT

Not Applicable

THE NAMES OF PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The invention relates to steam generator heating tube repair sleeves and methods for repairing steam generator heating tubes, and in particular to steam generators used in nuclear power plants.

2. Description of the Related Art

It is a matter of common knowledge that steam generators are used, inter alia, in power stations, especially in nuclear power stations. Steam generators are heat exchangers, through which a heated primary medium flows in a first circuit during operation, wherein the heat is then transferred to a secondary medium, in particular water, which flows in a second circuit separate from the first. After flowing through the steam generator, the water has then changed to a gaseous state of aggregation and is then available to drive a power station turbine. Especially in the case of nuclear power stations, where the primary medium is radioactively contaminated, strict and absolutely reliable separation between the first and second circuits in the steam generator must be preserved.

Steam generators essentially have a generally cylindrical vessel, which has respective clad tube plates at the axial ends thereof, wherein the interior space formed in this way is traversed by a multiplicity of steam generator heating tubes, which are joined to the cladding. In this way, as large as possible a contact area for heat exchange is formed between the two cooling circuits.

Steam generator heating tubes are welded leak-tightly to the cladding on the lower edge of the tube plate. If this weld seam is damaged, e.g. by foreign bodies, the leaktightness of the seam is no longer assured, and there may be a leak between the primary and the secondary medium. The damaged weld seams must be repaired in order to re-establish the separation between the primary and secondary media.

Hitherto, this has been accomplished by installing welded plugs. In this case, the standard practice is for steam generator heating tubes that have a leak at the weld seam to be sealed by means of welded plugs. To install welded plugs, a specific milled contour is first of all introduced. The bottom flange of the welded plug is used as filler material and is welded to the cladding of the tube plate by means of a TIG method (Tungsten Inert Gas). The seam serves both as a load bearing seam and as a sealing seam.

The disadvantage here is that the sealed steam generator heating tube no longer contributes to heat exchange between the primary and secondary circuits, and therefore there is a reduction in the efficiency of the power station. Because the steam generator also has a safety function in the case of incidents or accidents, the proportion of sealed tubes must not exceed a certain value, e.g. 10%. If the number of damaged weld seams in a steam generator is very high, installing welded plugs is no longer suitable as a repair measure.

Another prior art method involves re-welding. By re-melting the material, it is possible to close up defects in the seam, such as cracks or pores. However, in the case of re-welding, only small and superficial defects can be eliminated. Because no filler material is introduced, it is not possible to compensate for a lack of welding material. Moreover, the impurities in the original weld seam may be melted in again during re-welding, thereby possibly impairing the quality of the new seam. Re-welding damaged weld seams is therefore not a reliable and long-term repair method.

In addition, repair methods that involve repair sleeves are known. Thus, a repair sleeve for insertion into a defective tube end of a steam generator is disclosed in U.S. Pat. No. 4,592,577. A repair sleeve for insertion into a defective tube end of a steam generator is likewise disclosed in GB 1141239, wherein subsequent expansion by means of a rolling process is performed, giving a leak-tight joint with the tube end.

BRIEF SUMMARY OF THE INVENTION

An object of the invention is to provide a repair device and a repair method which, on the one hand, avoid the sealing of the steam generator heating tubes affected and, on the other hand, allow long-term and reliable repair of the damaged tube ends.

With the foregoing and other objects in view there is provided, in accordance with the invention, a steam generator heating tube repair sleeve, which at one end has an encircling flange that merges into a conical region that tapers on the outside in the direction of the other sleeve end and that is adjoined by a straight region. The invention also relates to a steam generator heating tube repair method for a steam generator heating tube which is installed in a steam generator and has a defective tube end, wherein the ends of a multiplicity of steam generator heating tubes are passed through respective clad tube plates and welded to the cladding, wherein, according to the method, a steam generator heating tube repair sleeve according to the invention is to be used. The invention also relates to a steam generator repaired in accordance with the invention.

In other words, this object is achieved by a steam generator heating tube repair sleeve which at one end has an encircling flange, which merges into a conical region that tapers on the outside in the direction of the other sleeve end and which is adjoined by a straight region.

The basic concept of the invention involves the installation of a short tubular sleeve or steam generator heating tube repair sleeve—also referred to as a "sleeve"—on the respective tube end that is damaged. The steam generator heating tube repair sleeve is fixed in the steam generator heating tube by being rolled in mechanically, and its lower edge is welded in a milled contour to the cladding of the tube plate. This ensures continued operation of the repaired steam generator heating tube, thus enabling continued problem-free operation of the respective steam generator, even after a large number of repairs. In addition, this also allows a high-quality and therefore durable repair of defective tube ends.

The defective weld seam is completely removed by prior conical milling of the tube end concerned and the milling in of a depression into the cladding around the defective tube end. Any impurities that may have contributed to the defect in the previous weld seam are thus eliminated in an advantageous manner.

The lower edge of the steam generator heating tube repair sleeve has a flange that serves as filler material during the welding process. The manual introduction of filler material during the welding process is thus avoided in an advantageous manner. The melted flange material is distributed in an advantageous manner into the milled depression, thus ensuring that the surface of the cladding remains virtually smooth. In addition to the necessary high quality of the weld seam, this also allows an accelerated repair process.

The conical region of the steam generator heating tube repair sleeve is matched accurately to the conically milled-out region of the tube end, thus allowing an accurate fit. This can be achieved, in particular, through the choice of an appropriate milling tool with the desired taper angle.

The outside diameter chosen for the straight region of the sleeve should be no greater than the respective minimum inside diameter of the defective tube end in order, in this way, to allow problem-free insertion of the steam generator heating tube repair sleeve according to the invention into the milled-out tube end. In a rolling-in process, the straight region of the inserted steam generator heating tube repair sleeve is then expanded, thus giving a leak-tight and secure joint with the tube plate.

The steam generator heating tube repair sleeve according to the invention furthermore allows particularly rapid repair of defective tube ends. This is of great importance, especially in the case of steam generators in nuclear plants, owing to the radiation to which the maintenance personnel are exposed. This is thereby reduced in an advantageous manner.

According to a preferred embodiment of the steam generator heating tube repair sleeve according to the invention, the thickness of the sleeve wall in the conical region is increased as compared with the straight region. The conical region as the essential and critical part of the repair zone is advantageously reinforced by such an increased wall thickness. The conical region is not necessarily provided for the rolling-in process, because there is a high accuracy of fit in any case in the conical region owing to the matching of the conical milling thereto. However, it is possible to achieve a further increase in the stability of the repair joint by rolling in in the conical region. An increased wall thickness does not present a problem during rolling in inasmuch as the wall material is not subjected to any major deformation during rolling in, owing to the high accuracy of fit of the sleeve. An increased wall thickness in this region thus also leads to increased stability of the joint to be created between the steam generator heating tube repair sleeve and the tube plate.

In the straight region, which is likewise provided for rolling in if required, a thinner sleeve wall can be chosen because, to this extent, the steam generator heating tube does not have a weak point in this rear region. In any case, either the conical or the straight region or, if appropriate, both should be rolled in. An illustrative thickness of a sleeve wall is, for example, one to two millimeters (1-2 mm) in the conical region and less than five tenths of a millimeter (<0.5 mm) in the straight region, this depending to a great extent on the respective boundary conditions and on the choice of material for the steam generator heating tube repair sleeve. The length of the steam generator heating tube repair sleeve should be designed in such a way that installation is possible even in the edge positions of the steam generator, and it is ten to fifteen centimeters (10-15 cm), for example.

According to a particularly preferred embodiment of the steam generator heating tube repair sleeve according to the invention, the length of the conical region corresponds to at least one and a half times (>1.5×) the sleeve inside diameter at the flange end, which, for its part, is two and five tenths centimeters (2.5 cm), for example. A relatively long conical region of this kind makes it possible to produce a stable repair joint simply by rolling in the conical region. Owing to the high accuracy of fitting of the steam generator heating tube repair sleeve into the conical bore, and even in the state before rolling in, an increased wall thickness can also be rolled in without problems, and the resulting joint is of particularly high quality.

According to another variant of the steam generator heating tube repair sleeve according to the invention, the thickness of the sleeve wall in the conical region is reduced towards the straight region. Overall, an approximately constant wall thickness of the steam generator heating tube repair sleeve and the conically milled steam generator heating tube is thus obtained in the conical region, with an ideally constant inside diameter of the repair joint.

According to another embodiment of the steam generator heating tube repair sleeve according to the invention, a thin rough layer is provided at least on partial areas of the outer surface. This layer, also referred to as a microlock, improves the anchoring of the steam generator heating tube repair sleeve in the steam generator heating tube and avoids rotation of the repair sleeve during the installation thereof, especially during rolling in. An insignificant partial increase in the outside diameter of the repair sleeve caused thereby is immaterial because a slight clearance is envisaged in any case for inserting the repair sleeve into the milled-out tube end without problems. The clearance is then completely eliminated by the rolling-in process.

According to a particularly preferred embodiment, the steam generator heating tube repair sleeve according to the invention is produced at least predominantly from the material INCONEL 690®. This is distinguished by good corrosion resistance and suitability for welding to the cladding material. Likewise suitable, on the basis of these properties and its good behavior when rolled in, is an alloy such as the one sold under the trade name INCOLOY 800®. It is thereby also possible to achieve rolling in of relatively high wall thicknesses, in the region of one millimeter and above ($\geq$1 mm), without cracking.

INCONEL 690® is a high-chromium nickel alloy. The weight percentage of chromium in the alloy is preferably 27.0 to 31.0. The unified numbering system (UNS) identifier from INCONEL 690® is UNS N06690/W. Nr. 2.4642.

INCOLOY 800® is a nickel-iron-chromium alloy. The unified number system (UNS) identifier for INCOLOY 800® is UNS N08800/W. Nr. 1.4876.

The object is also achieved by a steam generator heating tube repair method for a steam generator heating tube which is installed in a steam generator and has a defective tube end, wherein the ends of a multiplicity of steam generator heating tubes are passed through respective clad tube plates and welded to the cladding. The method includes the following steps:

conical milling out of the defective tube end and milling a depression into the cladding around the defective tube end, insertion of a steam generator heating tube repair sleeve according to the invention into the conically milled-out defective tube end, wherein the outer sleeve contour is matched, at least in the conical region, to the inner contour of the milled-out tube end, rolling in the steam generator heating tube repair sleeve in the straight and/or conical region thereof, and welding the flange region of the rolled-in steam generator heating tube repair sleeve to the cladding to form a sealing seam.

The defective tube end is milled with the aid of a conical milling cutter. The milling cutter centers itself in the steam generator heating tube by using its tip. The diameter and the angle of the conical region of the milling cutter are configured in such a way that the old, defective weld seam is completely removed. A new milling contour is formed, with a depression for accommodation and subsequent welding of the steam generator heating tube in the flange region thereof. A high accuracy of fit of the conical region of the steam generator heating tube repair sleeve with the conically milled tube end is thereby achieved.

Apart from the advantages already mentioned in connection with the steam generator heating tube repair sleeve, this method proves not only to provide a joint between the repair sleeve and the tube plates that is necessarily of very high quality but also to be very rapid to make. A rapid repair reduces radiation exposure of the repair personnel.

According to another embodiment of the method according to the invention, welding is carried out by a TIG welding method (Tungsten Inert Gas). This has proven particularly suitable and leads to high-quality weld seams.

According to another variant of the method, welding of the inserted steam generator heating tube repair sleeve is carried out even before the latter is rolled in. This avoids rotation of the repair sleeve during the rolling-in process.

According to another variant of the method, the steam generator heating tube repair sleeve is rolled in in a plurality of processing steps. Particularly in the case of an internal steam generator heating tube diameter that is stepped axially towards the rear, a different rolling-in tool may be necessary for each step, thus requiring a further processing step.

According to a particularly preferred variant of the method, this is performed on a defective end of a steam generator heating tube of a radioactively contaminated steam generator of a nuclear plant. Owing to the extremely high safety requirements applying in that case, the high quality and long life of the outcome of repair achieved in accordance with the method are particularly significant. Moreover, the radiation exposure of the repair personnel is advantageously reduced, owing to the short time required for the method according to the invention. The sequence of steps mentioned may also be interchanged within certain limits, provided this has no effect on the end result.

The advantages according to the invention also extend to a steam generator including a multiplicity of steam generator heating tubes, the two ends of which are passed through respective clad tube plates and welded to the cladding, wherein the repair method according to the invention has been employed on at least one tube end. Owing to the continued use of a steam generator heating tube repaired in accordance with the invention, the efficiency of a steam generator does not in fact fall, even when repaired many times, and the steam generator can advantageously be operated reliably over a longer period of service by virtue of the high-quality and long-life repair.

These advantages extend especially to a radioactively contaminated steam generator, the replacement and disposal of which after a foreshortened service life is particularly expensive.

Further advantageous possibilities for embodiments can be found in the other dependent claims.

DETAILED DESCRIPTION OF THE INVENTION

Figure 1:
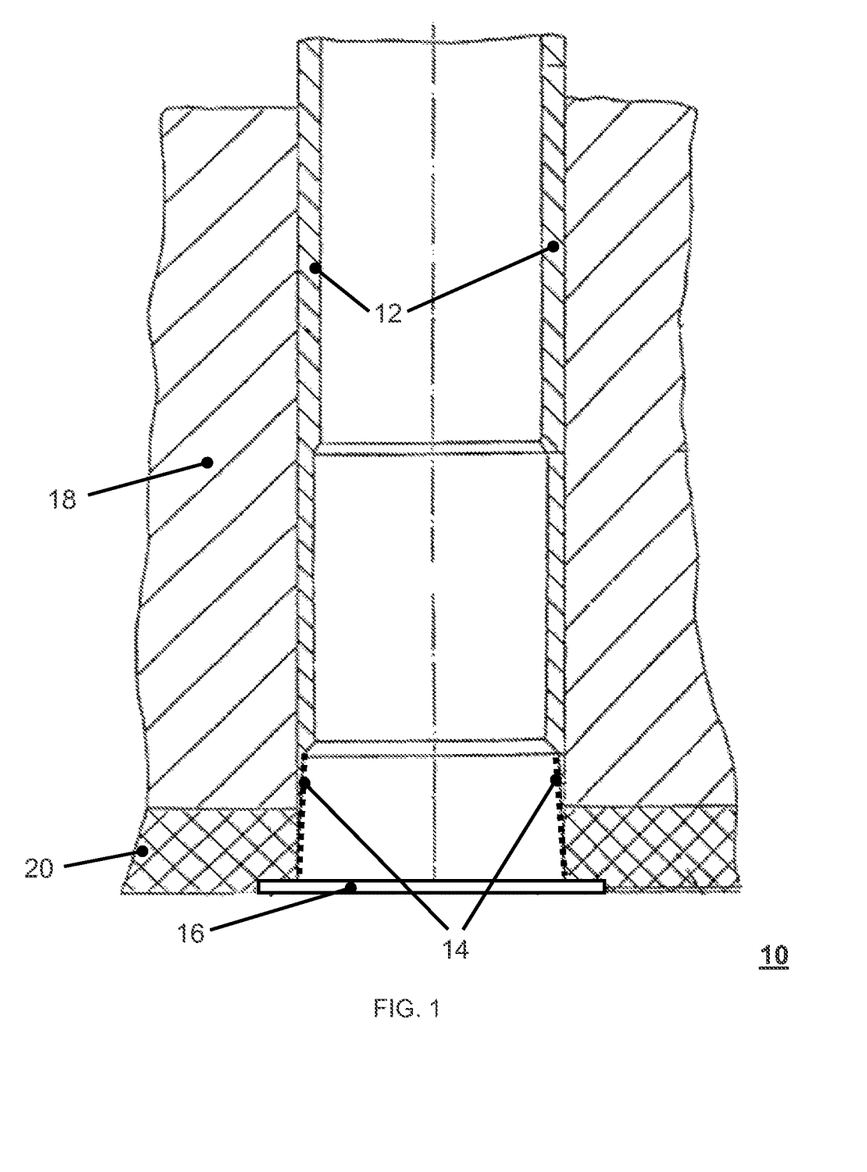
FIG. 1 is a diagrammatic, side sectional view showing a steam generator heating tube in a clad tube plate according to the invention.

FIG. 1 shows an illustrative steam generator heating tube 12 in tube plate 18 with a cladding 20 in a view 10. The steam generator heating tube 12 has been subjected to conical milling 14 in the front end region of the heating tube 12. In addition, a depression 16 has been milled into the surface of the cladding 20 of the tube plate 18. The previous, defective weld seam (not shown) has thereby been completely removed, as have therefore also any impurities that may have led to the defect in the weld seam. The steam generator heating tube 12 is shown with an inside diameter that decreases in steps and with a wall thickness that increases in steps in the rear region thereof. A greater wall thickness is necessary as the steam generator heating tube emerges from the tube plate because the stabilizing effect of the latter is then lost. The steam generator heating tube 12 shown is thus prepared for the insertion of a steam generator heating tube repair sleeve or "sleeve" according to the invention.

Figure 2:
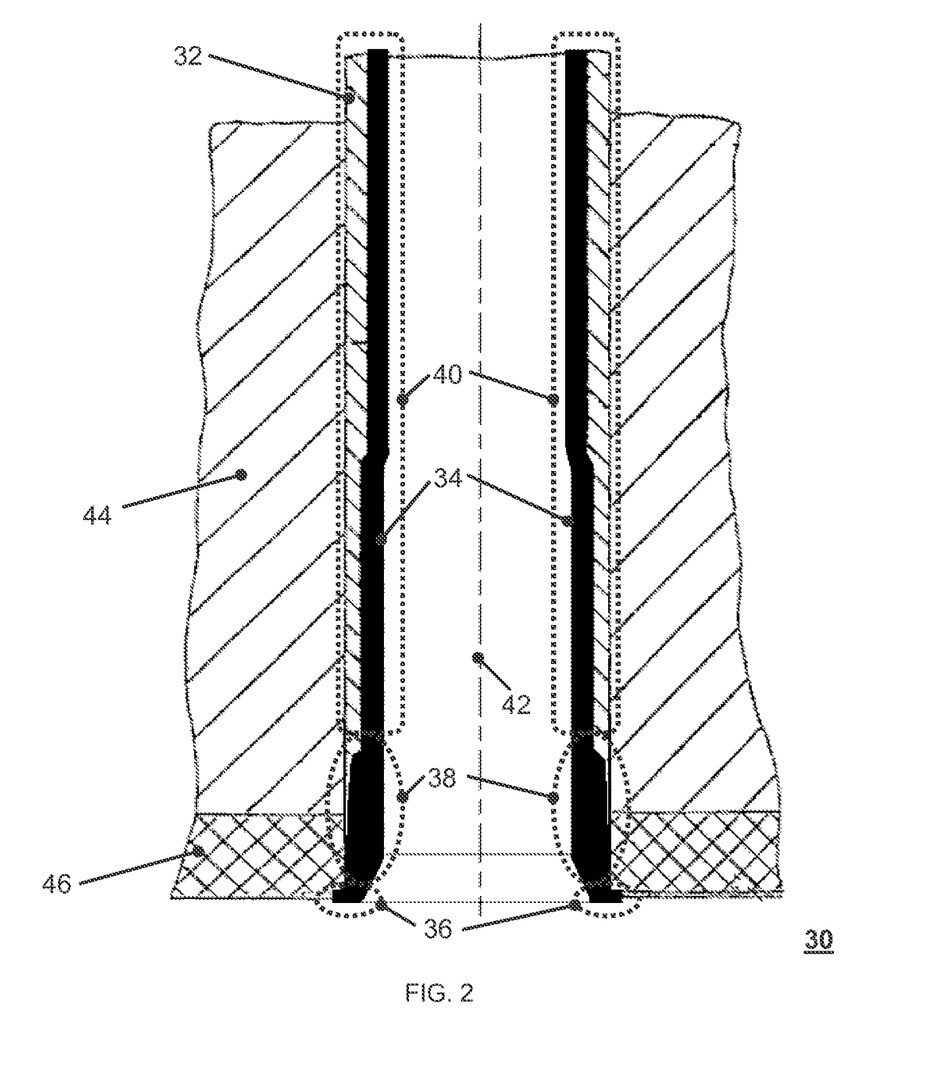
FIG. 2 is a side sectional view showing a steam generator heating tube that has been repaired accorded to the invention.

FIG. 2 shows an illustrative repaired steam generator heating tube 32, which is passed through a tube plate 44 and a cladding 46 disposed thereon, in a view 30. A steam generator heating tube repair sleeve 34 is then inserted into the tube end prepared in accordance with FIG. 1. The sleeve 34 is preferably rolled in in the upper, straight region 40 thereof, i.e. expanded in diameter to the respective inside diameter of the tube end; the straight region 40 is marked with dotted lines. As a result, a hermetic joint between the steam generator heating tube 32 and the steam generator heating tube repair sleeve 34 is ensured. Owing to the stepping of the steam generator heating tube 32, several rolling-in steps were necessary. In a conical region 38, which is marked with dotted lines, the conical external shape of the steam generator heating tube repair sleeve 34 and the conical internal shape of the milled tube end are matched precisely to one another, thus giving an accurately fitting joint in this location. In a flange region 36, which is marked with dotted lines, a flange surrounding the steam generator heating tube repair sleeve 34 rests in a milled-in depression, which is designed in such a way that the flange material approximately fills the depression as it melts in the subsequent welding process. The steam generator heating tube repair sleeve 34 and the steam generator heating tube 32 extend in a rotationally symmetrical manner around an imaginary center line 42.

Figure 3:
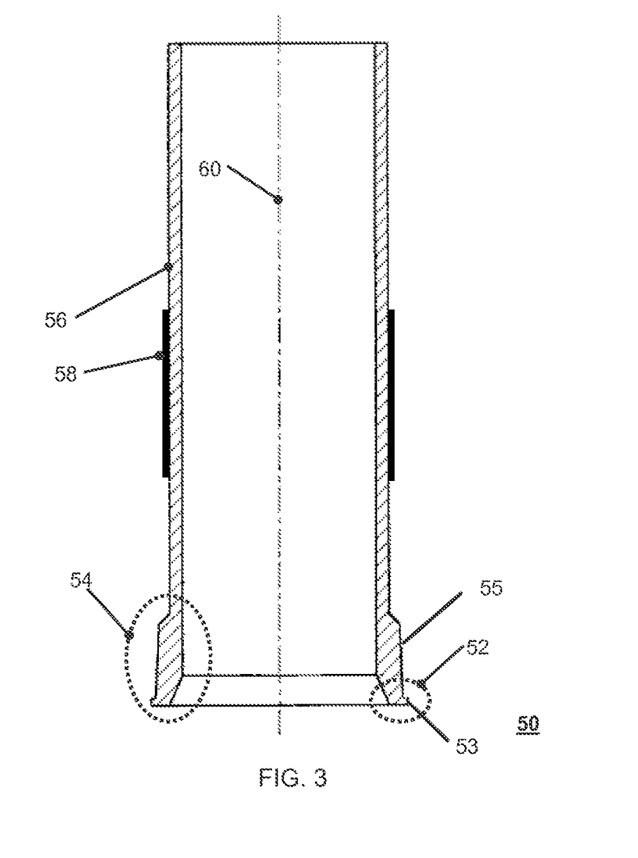
FIG. 3 is a side sectional view showing a first embodiment of a steam generator heating tube repair sleeve according to the invention.

FIG. 3 shows a first embodiment of a steam generator heating tube repair sleeve 50 (not yet rolled in) in a sectional view. An encircling flange 53 is provided in the lower flange region 52. The flange 52 is melted during the subsequent welding operation and joined to the cladding of a respective tube plate. A conical region 54 is embodied with a thickened wall 55. The conical region 54 is not provided for rolling in. An adjoining straight region 56 is provided for rolling in and therefore has an outside diameter which is marginally smaller than the inside diameter of a respective steam generator heating tube to be repaired. A thin rough layer 58, referred to as a microlock, is provided over a certain area of the outer surface of the straight region 56 in order to avoid rotation of the steam generator heating tube repair sleeve 50 during the subsequent rolling-in process. The steam generator heating tube repair sleeve 50 extends in a rotationally symmetrical manner around an imaginary center line 60. The steam generator is preferably produced from an alloy such as the one sold under the trade name INCONEL 690®, which has proven particularly suitable for this application.

Figure 4:
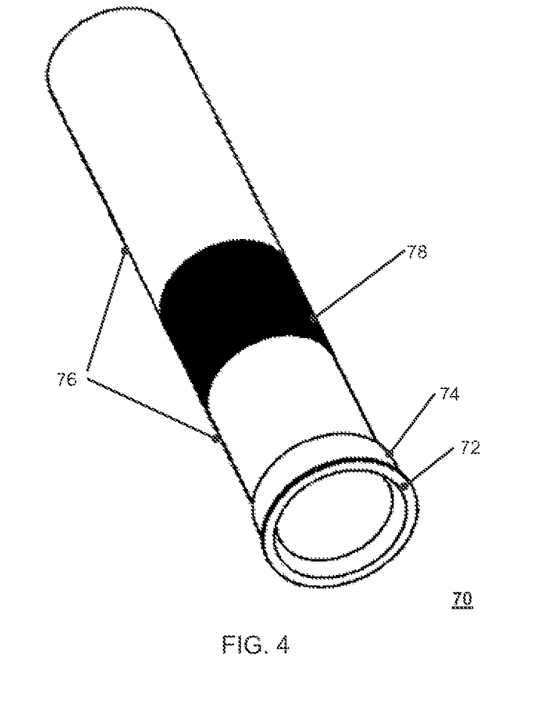
FIG. 4 is a perspective view showing a second embodiment of a steam generator heating tube repair sleeve according to the invention.

FIG. 4 shows a second embodiment of a steam generator heating tube repair sleeve 70 in a three-dimensional view. A flange region 72 is provided at the bottom end. Adjoining the flange region 72, in the direction of the other sleeve end, is a conical region 74 and then a straight region 76. The straight region 76 is surrounded at the outer surface thereof by a thin rough layer 78, which prevents rotation of the steam generator heating tube repair sleeve 70 during the rolling-in operation.

Figure 5:
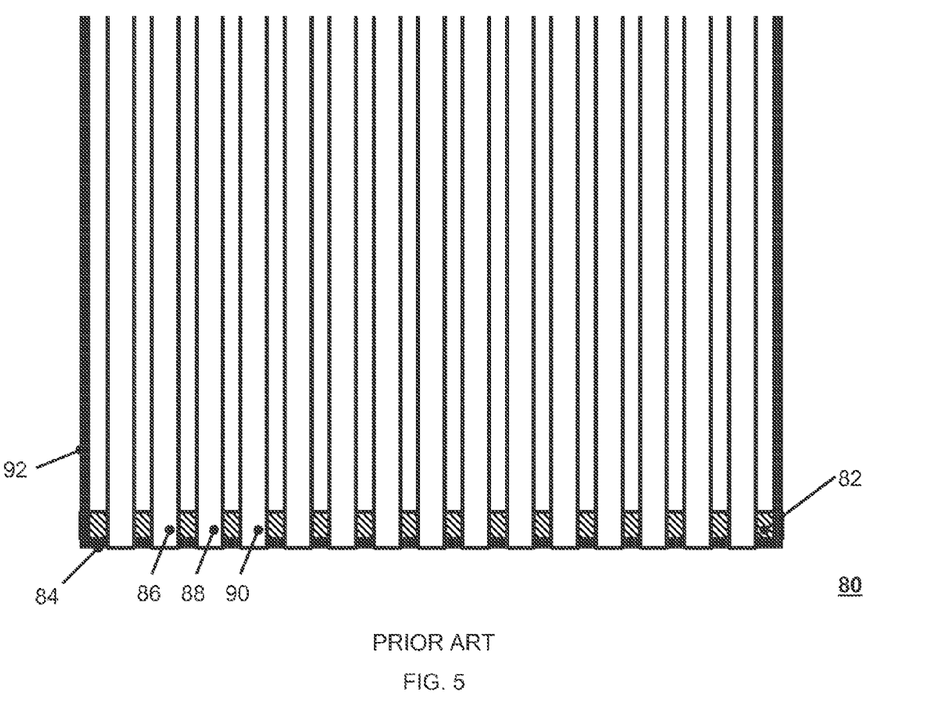
FIG. 5 is a partial schematic view showing an end of a steam generator according to the prior art.

FIG. 5 is a schematic view of an embodiment of a steam generator 80. Walls 92 and a tube plate 82 with cladding 84 form a closed interior space, through which a plurality of steam generator heating tubes 86, 88, and 90 is passed. The respective ends of said tubes are passed through holes in the tube plate 82 and the adjoining cladding 84 and are welded to the cladding 84. During the operation of the steam generator 80, there is a flow of a first medium through the interior space thereof, while there is a flow of a second medium through the steam generator heating tubes 86, 88, 90. The two media must be separated completely and reliably from one another, and mixing must be avoided at all costs. In the event of a repair, the repair method according to the invention is applied to the respective defective tube end.

Figure 6:
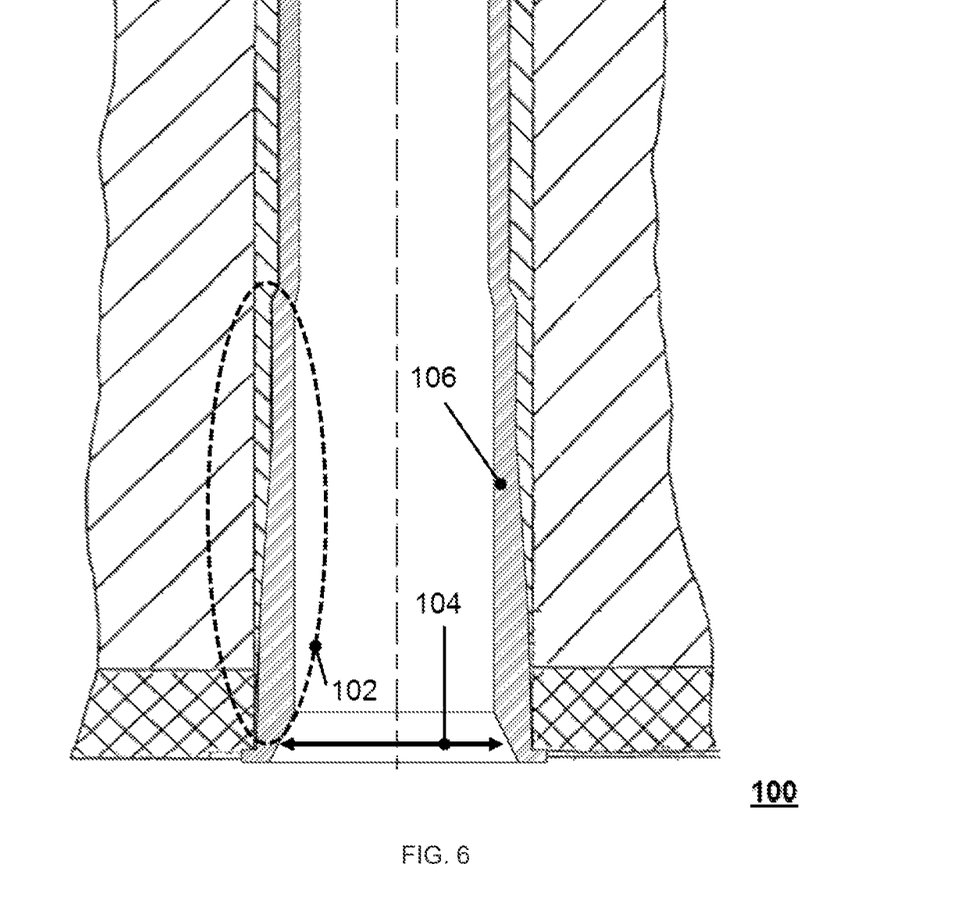
FIG. 6 is a side sectional view showing a second embodiment of a repaired steam generator heating tube with according to the invention.

FIG. 6 shows an embodiment of a second repaired steam generator heating tube in a sectional view 100. A steam generator heating tube repair sleeve 106 has a conical region 102, which is marked with a dotted line and which corresponds to approximately twice the inside diameter 104 of the flange end of said sleeve. The steam generator heating tube repair sleeve 106 has been inserted into a milled-out steam generator heating tube and rolled in in its conical region. By virtue of the relatively long design of the conical region 102, rolling in in the straight region adjoining at the rear is not necessary. The wall thickness of the steam generator heating tube repair sleeve 106 decreases towards the rear by the same measure as the wall thickness of the steam generator heating tube subjected to conical milling increases, with the result that, overall, an approximately constant wall thickness of the steam generator heating tube repair sleeve and the steam generator heating tube is obtained in the conical region.

What is claimed is:

1. A steam generator heating tube repair method for a steam generator heating tube installed in a steam generator and having a defective tube end and further having a multiplicity of steam generator heating tubes passing through respective tube plates, said tube plates being welded to a cladding, the method which comprises:
   conical milling out of the defective tube end and milling a depression into the cladding around the defective tube end, said conical milling out defining an inner contour of the defective tube end;
   inserting a steam generator heating tube repair sleeve into said conically milled-out defective tube end; said steam generator heating tube repair sleeve including a conical region, an encircling flange, and a straight region, said conical region having two ends and being tapered on an outside of said conical region toward a first of said two ends, said conical region having an outer contour, said conical region having a wall thickness, said encircling flange merging into said conical region, said encircling flange being disposed on a second of said two ends of said conical region, said straight region being adjoined to said first of said two ends of said conical region, said straight region having a wall thickness; and said wall thickness of said conical region being greater than said wall thickness of said straight region; said outer contour of said conical region matching said inner contour of said milled-out defective tube end;
   rolling in the steam generator heating tube repair sleeve in at least one of said straight region and said conical region; and
   welding said encircling flange of said rolled-in steam generator heating tube repair sleeve to said cladding to form a sealing seam.

2. The steam generator heating tube repair method according to claim 1, wherein said welding is carried out by a tungsten-inert-gas welding method.

3. The steam generator heating tube repair method according to claim 1, wherein said welding of the inserted steam generator heating tube repair sleeve is performed before rolling in the steam generator heating tube repair sleeve.

4. The steam generator heating tube repair method according to claim 1, wherein said steam generator heating tube repair sleeve is rolled in in a plurality of processing steps.

5. The steam generator heating tube repair method according to claim 1, wherein said steam generator is radioactively contaminated.

* * * * *